3,087,921
POLYTETRAFLUOROETHYLENE MOLDING POWDER
Alfred Lee Mathews, Jr., and Robert Roberts, Wilmington, Del., assignors to E. I. du Pont de Nemours and Company, Wilmington, Del., a corporation of Delaware
No Drawing. Filed Sept. 2, 1958, Ser. No. 758,571
6 Claims. (Cl. 260—92.1)

The present invention relates to polytetrafluoroethylene molding powders and more particularly to a method for producing a free-flowing polytetrafluoroethylene molding powder especially suitable for machine feeding.

Polytetrafluoroethylene prepared through the polymerization of tetrafluoroethylene is basically obtained in two forms, granular and dispersion polymer. Granular polymer is obtained by polymerization of tetrafluoroethylene in the presence of an aqueous phase containing the free-radical catalyst in the absence of any other additives such as described in U.S. 2,393,967 issued to M. M. Brubaker on February 5, 1946, for example. The polymer is obtained in powder form, the particles of which are of rough irregular shape and super colloidal in size having a total surface area of from 1 to 4 square meters per gram as measured by nitrogen adsorption corresponding to a theoretical average particle diameter of 0.67 to 2.67 mm. on the assumption that all particles are spherical. Dispersion polymer is obtained by polymerizing tetrafluoroethylene in the presence of a free-radical catalyst and a dispersing agent and other additives which prevent coagulation. This polymerization results in the formation of polymer particles of colloidal size which remain dispersed in the aqueous phase, as described for example, in U.S. 2,750,350, issued to A. E. Kroll on June 12, 1956. The polymer particles in the dispersion are roughly spherical in shape averaging about 0.1 to 0.3 micron in diameter. The disperson may, however, be coagulated by agitation and/or addition of organic solvents which cause coagulation such as acetone or methanol, as disclosed in U.S. 2,593,583, issued to J. F. Lontz on April 22, 1952. The products obtained from the coagulation and dewatering depend in part on the method employed in coagulating the aqueous dispersion, but are generally defined as fine powders and are generally agglomerates of the dispersion particles which retain in part their original shape.

Because of the unique properties of polytetrafluoroethylene, the physical properties of the particles such as their size, shape, compressibility, shear characteristics become of extreme importance. Although polytetrafluoroethylene is a thermoplastic polymer, in that it consists of long carbon chains which are neither substantially branched nor cross-linked, it does not possess the characteristic melt flow properties of vinyl polymers above their melting points. Polyeterafluoroethylene does, however, have a first order transition temperature at 327° C. at which the crystallinity disappears and the polymer particles sinter together to give a bonded, dense structure. Polytetrafluoroethylene above its crystalline melting point forms a brittle gel which has such a high melt viscosity that it may be considered self-supporting for most practical purposes. Thus rather than attempting to modify melt-extrusion and molding techniques to become suitable for the fabrication of polytetrafluoroethylene new techniques, as far as the fabrication of plastics was concerned, were developed for polytetrafluoroethylene. These methods are based on the self-supporting property of the gel and comprise preforming the polymer powders under pressure in a mold to the desired shape, followed by sintering of the shaped article to obtain a coalesced, continuous structure.

In general, two major fabricating techniques have been developed. One, a molding technique which comprises filling a mold with a measured amount of polymer powder, followed by compressing the powder to the desired shape, removing the resulting "preform" and free-sintering it at a temperature above 327° C. Two, an extrusion technique which comprises extruding the polymer powder under pressure with a lubricating agent through a die, forming a preform of the desired article in the die, removing the lubricant and sintering the extruded preform at a temperature above 327° C. There are, of course, various refinements of these two basic processes. Nevertheless the success of these fabricating techniques depends primarily on the properties of the polymer powder obtained from the two described polymerization techniques. Thus granular polymer powder is better suited for molding purposes because it flows better than dispersion polymer, forms a stronger preform, can be readily removed from the mold, and does not crack when sintered in thick sections, indicating that it is better suited to withstand the expansion and contraction cycle occurring during sintering. Dispersion polytetrafuoroethylene powder on the other hand is better suited than granular polymer for extrusion techniques because it is more readily sheared and deformed and as a result thereof, gives rise to a stronger preform. However, when dispersion polymer powder is compacted to form sheetings, the preform adheres to the mold and is not readily removed because it is brittle and weak. Both granular and dispersion polymer have poor handling characteristics in that they are difficult to level in a mold thus giving rise to non-uniform pressure distribution during the preform molding step which causes the formation of areas of low strength and high permeability during the sintering step and results in poor control of the dimensions of the molded parts. Both polymer types have furthermore poor powder-flow characteristics which makes them unsuitable for use in automatic feeding devices in that the powder flow is very low and irregular.

It is therefore the object of the present invention to provide an improved polytetrafluoroethylene molding powder. It is a further object of the present invention to provide a molding powder which has improved handling characteristics and can be employed in automatic feeding machines. Another object is to provide a molding powder which on compression under reasonable pressure will sinter into impermeable structures. Yet another object is to provide a molding powder which has a high bulk density. Still another object of the present invention is to provide a process for the preparation of improved polytetrafluoroethylene molding powder. Other objectives will become apparent hereinafter.

The objects of the present invention are accomplished by a process which comprises heating unsintered polytetrafluoroethylene powder to a temperature of 50° C. to 300° C. and preferably to a temperature of 60° C. to 200° C., compacting the polymer to a density of at least 2.15 g./cc. and preferably to a density of 2.15 to 2.23 g./cc. and thereafter cooling and comminuting the compacted polymer. The density of the polymer obtained in compaction will depend on the temperature of the polymer, the pressure applied and the time for which the pressure is applied, increasing with increase of either of these variables. At a temperature of 60° C. the minimum pressure required to achieve the critical density is 2000 p.s.i. The time for which the pressure is employed should be sufficient to relax the compressed polymer particles. Such time will decrease with increasing temperatures but should be at least one minute and preferably five minutes. The increase in density obtained by a further increase in pressure or time is small compared to the increase obtainable with an increase in temperature. At higher temperatures, such as 150–250° C. the critical density may be obtained with lower pressures and in shorter times. In the range of 150 to 250° C. preferred densities of above 2.200 are obtained with pressures of 1000 to 3000 p.s.i. The preform obtained on the compacting step is extremely brittle and is readily shattered by impact and can consequently be comminuted into a free-flowing, high apparent density molding powder. The formation of the brittle preform and its ability to be comminuted into a free-flowing powder only occurs at the elevated temperatures. Molding powder prepared from comminution of polymer compacted at or below room temperature does not have the free-flowing characteristics of compacted polymer powder prepared at elevated temperatures.

The pressure employed in the process of the present invention must, as stated hereinabove, be at least high enough to compact the polymer to a density of 2.15 g./cc. The minimum pressure necessary to achieve this density will vary with the temperature, decreasing as the temperature is increased. It is generally preferred to employ a relatively low pressure, and thus a higher temperature.

It was further discovered that the process of the present invention is applicable to both dispersion and granular polytetrafluoroethylene, as a matter of fact slightly wet polymer as obtained directly on dewatering of the polymerization mixture can even be compacted to give rise to the high density preform which on comminution becomes a free-flowing molding powder.

The process of the present invention when used with dispersion polymer powders, furthermore, eliminates the sticking of the polymer powder to the mold, which occurs when unmodified dispersion polymer powder is used and which makes that polymer unsuitable for compression molding. It is, however, essential that the polymer employed in the present invention is polymer powder which has not been heated previously to above the crystalline melting point of polytetrafluoroethylene. Sintered polymer powder can not be compression molded by the methods described herein. The polymer, in one embodiment of the present invention, is charged into a mold which is most suitable for compacting large amounts of polymer, such as molds with high volume to surface ratios. The mold is then heated to the desired temperature and time is allowed for the polymer to come to this temperature. Steam heated molds are suitable for such purposes. After the polymer has attained the desired temperature pressure is applied to the mold for a time sufficient to compact the polymer in the mold. The polymer preform can be removed from the mold at the elevated temperatures or when cooled to room temperature. The preform on cooling to room temperature is extremely brittle and shatters when subjected to impact. The preform is comminuted by impact, cutting or a combination of both until the polymer is again obtained in powder form. The disintegration or cutting of the polymer preform may be carried out in various ways. The polymer can be disintegrated by water cutting in which the polymer pieces are cut in an aqueous medium by a rapidly rotating blade. Other methods involve putting the polymer through commercially available dry disintegrators or cutters.

The compacted polymer obtained by the present process is generally cut into a size which has an average diameter of smaller than 1000 microns and preferably from 200 to 500 microns. Particles having these diameters are preferred since they are more readily compressed to preforms and on sintering give rise to structures which are substantially free of voids. The polymer particles although of irregular shape have relatively smooth surfaces. Polymer compressed at room temperature and disintegrated in a similar way does not have the same shape, but has rough irregular surface and is frequently sheared and fibrillated.

The polymer powders thus obtained have excellent flow characteristics and are extremely suitable for automatic feeding devices employed in ram extrusion machines and large molding presses. Preforms molded at room temperature from this improved molding powder are of sufficient strength to be handled and do not adhere to the mold and can therefore be readily removed and free-sintered. The molded articles obtained from such powders upon preforming and sintering have electrical and mechanical properties equivalent to those obtained with unprocessed granular molding powder.

The present invention is further illustrated by the following example.

EXAMPLE I

A sheet mold comprising a male and female part having a cavity of 4″ x 5″ x 1″ was charged with a 40 g. sample of granular or dispersion polytetrafluoroethylene powder heated to the temperature indicated as preforming temperature in Table I. The powder was leveled with a straight edge and a silicone rubber caul followed by a heated steel plunger was placed on the level polymer. The mold lay-up was placed in a press having platens heated to the preforming temperature. The pressure on the mold was raised to 2000 p.s.i. over a period of one minute and held at that pressure for 5 minutes. The resulting preform was removed from the mold and cooled to room temperature. The density of the preform was determined by water displacement measurements. The preform was broken by hand and the resulting pieces were disintegrated into a fine powder by placing 40 g. of polymer in a Waring Blendor with 100 ml. of water and running the Blendor at high speed for a period of 2 minutes. The resulting ploymer powder was filtered and dried.

The polymer powder was evaluated with respect to

*Table I*

| Polymer type | Molding powder properties | | | | | | | Properties of sintered articles | | | |
|---|---|---|---|---|---|---|---|---|---|---|---|
| | Preforming temp., °/C. | Preform density, g./cc. | Flow index, g./sec. | Leveling quality | Wet sieve, $d_{50}$ in. microns | Apparent density g./l. | Appearance of powder on disintegration | Dielectric strength, volts/mil | Tensile strength, lbs./in.[2] | Elongation, percent | Porosity, percent |
| Commercial powders: | | | | | | | | | | | |
| Granular | | | 3-7 | Poor | 460-700 | 472-522 | Fibrillated | 287 | 2,167 | 173 | 1.6 |
| Dispersion | | | (1) | Extremely poor | 350-650 | 400-600 | ____do____ | Cannot be molded | | | |
| Densified: | | | | | | | | | | | |
| Granular | 25 | 2.13 | 8 | Poor | 400-500 | 600-700 | ____do____ | No improvement over commercial powder | | | |
| Dispersion | 25 | 1.93 | (1) | Extremely poor | (1) | (2) | Difficult to disintegrate, very fibrillated. | Poorer than starting material | | | |
| Granular | 60 | 2.16 | 20 | Good | 250-450 | 750-850 | Distinct particles | 304 | 2,150 | 180 | 1.7 |
| Do | 170 | 2.22 | 20 | ____do____ | 250-450 | 850-1,000 | ____do____ | 400 | 2,755 | 243 | 0.4 |
| Dispersion | 180 | 2.18 | 17 | ____do____ | 200-400 | 800-1,000 | ____do____ | (250-300) | 1,650 | 30 | 1.1 |

[1] Not measurable.  [2] Very low (ca. 200-300).

NOTE.—Test methods: (1) Flow index; (2) dielectric strength, ASTM-D 149-44; (3) apparent density, (4) wet screen, (5) tensile properties, ASTM-D 1457-56T.

its powder flow characteristic as shown in Table I and compared to commercial polymer not subjected to the above-described procedure and also compared to polymer powder preformed at room temperature and then disintegrated. The flow index of the polymer powder was determined by filling a polytetrafluoroethylene pipe 9" high a 2" in diameter and having a 6 mesh screen attached across the base of the pipe with the polymer powder and thereafter subjecting the pipe to a vibration having a frequency of 675 cycles per sec. and an amplitude of 0.3". The amount of powder flowing through the screen was continuously weighed and recorded. From the resulting curve the flow index was calculated as g./sec. The leveling quality of the polymer powder, which becomes extremely important when the powder is automatically fed, was determined qualitatively by the difficulty encountered in filling and leveling the mold employed to prepare the sintered article. The wet sieve and apparent density were determined by ASTM-D-1457-56T and are a measure of the particle size of the polymer powder and the bulk density of the polymer powder. The appearance of polymer powder when subjected to the disintegration is noted.

The polymer powder was then molded into sheets by charging 43 g. of the respective treated or untreated, granular or dispersion polymer powders into the above described mold and preforming the mold under the same conditions as employed in the first preforming step. The resulting preform was sintered in an oven for one hour at 375° C.±7° C. The sintered sheet was cooled at the rate of 3° C. per minute. The dielectric strength, measured by the method disclosed in ASTM-D-149-44, tensile strength and elongation, as measured by ASTM-D-1457-56T employing a testing rate of 2"/min. and poroisty of the sintered sheet, calculated from the following equation $$\left[\frac{\text{Inherent density}-\text{bulk density}}{\text{Inherent density}}\right]\times 100$$

were determined and are listed in Table I.

As can be seen from the results listed in Table I, the polymer powders which have been preformed to a density above 2.15 have markedly better powder-flow properties. It is also seen from the table that dispersion polymer powder which can not ordinarily be compression molded, could be compression molded when preformed to a density above 2.15. Dispersion polymer powder-flow characteristics could not be determined because of the fibrillated structure of the polymer and because of the adhesion of the polymer powder particles to each other and also could not be molded into sheets as indicated in the table because the preform cracked during the compression molding step and furthermore adhered to the mold and could therefore not be removed from the mold without being broken up. As can be seen from the table, the properties of sintered articles prepared from the improved flow powders are equal to and better than the properties obtained on sheets prepared with untreated powder. In the case of dispersion polymer powder the improved flow methods provide the only way of compression molding the polymer.

The example has illustrated the improved properties of polytetrafluoroethylene powders prepared by the process of the present invention when employed in molding operations. The process as illustrated in the present invention may be varied without departing from the scope of the present invention. Thus it is possible to continuously prepare the compacted polymer by preheating the polymer and then compacting it by passing the polymer through heated calendering rolls. As stated hereinabove, various methods of disintegrating the polymer may be employed. It is essential, however, to compact the polymer to a density above 2.15 g./cc. at a temperature of 50° to 300° C.

The molding powders obtained by the process of the present invention are superior in handling and flow to polytetrafluorethylene powders employed heretofore. The molding powders have improved handling characteristics in that they readily fill molds and are easily leveled in molds. They are especially suitable for automatic feeding equipment in large scale and continuous molding and extrusion machines fabricating polytetrafluoroethylene. The molding powder obtained by the present invention can be preformed and removed from the mold without adhering to the mold and can be sintered into articles of outstanding mechanical and electrical properties. Preforms prepared with the molding powders of the present invention have outstanding dimensional stability and thus allow the preparation of articles with close tolerances.

As stated hereinabove the process of the present invention is applicable to granular as well as dispersion polymer powder. The improved molding powders of the present invention may also be prepared from filled compositions of polytetrafluoroethylene containing such finely divided fillers as carbon black, asbestos, silica and related compounds. The molding powder prepared by the process of the present invention can be employed in all applications in which the unmodified polymer has been employed.

We claim:
1. A process for preparing polytetrafluoroethylene molding powder which comprises heating unsintered polytetrafluoroethylene powder, as obtained by the polymerization of tetrafluoroethylene in an aqueous phase after removal of the aqueous phase, to a temperature of 50° C. to 300° C., maintaining and simultaneously compacting the polymer powder at said temperature to a density of at least 2.15 g./cc. by the application of 1000 to 3000 p.s.i. pressure for a period of at least one minute, and thereafter comminuting the polymer to a powder.

2. A process for preparing polytetrafluoroethylene molding powder which comprises heating unsintered polytetrafluoroethylene powder, as obtained by the polymerization of tetrafluoroethylene in an aqueous phase after removal of the aqueous phase, to a temperature of 60° C. to 200° C., maintaining and simultaneously compacting the polymer powder at said temperature to a density of at least 2.15 g./cc. by the application of 1000 to 3000 p.s.i. pressure for a period of at least one minute, and thereafter comminuting the polymer to a particle size of less than 1000 microns in diameter.

3. The process as set forth in claim 2 wherein the polytetrafluoroethylene is dispersion polymer powder.

4. The process as set forth in claim 2 wherein the polytetrafluoroethylene is granular polymer powder.

5. A polytetrafluoroethylene molding powder comprising unsintered polytetrafluoroethylene polymer powder having an apparent density of 750 to 1000 g./l., a flow index of 17 to 20 g./sec., and a particle size of 200 to 1000 microns in diameter, produced by the process of claim 1.

6. The product of claim 5 wherein the density is from 2.150 to 2.300 g./cc.

References Cited in the file of this patent

UNITED STATES PATENTS

| | | |
|---|---|---|
| 2,456,262 | Fields | Dec. 14, 1948 |
| 2,564,024 | Miller | Aug. 14, 1951 |
| 2,578,523 | Llewellyn | Dec. 11, 1951 |
| 2,593,583 | Lontz | Apr. 22, 1952 |
| 2,643,988 | Walter | June 30, 1953 |
| 2,751,376 | Barnhart et al. | Mar. 10, 1953 |
| 2,770,842 | Hahn et al. | Nov. 20, 1956 |
| 2,781,552 | Gray | Feb. 19, 1957 |
| 2,788,545 | Bauer | Apr. 16, 1957 |
| 2,851,407 | Nickerson | Sept. 9, 1958 |

OTHER REFERENCES

Halls, Plastics of London, January 1947, pages 28–31, page 31.